United States Patent
Choi

(10) Patent No.: US 7,729,632 B2
(45) Date of Patent: Jun. 1, 2010

(54) HIGH VOLTAGE POWER SUPPLY AND A HIGH VOLTAGE POWER CONTROL METHOD THEREOF

(75) Inventor: Jong-moon Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 655 days.

(21) Appl. No.: 11/278,731

(22) Filed: Apr. 5, 2006

(65) Prior Publication Data

US 2007/0092284 A1  Apr. 26, 2007

(30) Foreign Application Priority Data

Oct. 20, 2005  (KR) .................. 10-2005-0099178

(51) Int. Cl.
  *G03G 15/00* (2006.01)
  *G01R 29/02* (2006.01)
  *H03K 9/08* (2006.01)
(52) U.S. Cl. .................. 399/88; 399/90; 327/33
(58) Field of Classification Search ............. 399/88–90; 327/73
  See application file for complete search history.

(56) References Cited

U.S. PATENT DOCUMENTS 5,999,007 A  12/1999  Kimura
2003/0219267 A1*  11/2003  Shim et al. .................. 399/50

FOREIGN PATENT DOCUMENTS

| CN | 2559165 | 7/2003 |
|---|---|---|
| JP | 4-273617 | 9/1992 |
| JP | 8205534 | 8/1996 |
| JP | 10-69396 | 3/1998 |
| KR | 2000-58653 | 10/2000 |
| KR | 2002-61382 | 7/2002 |
| KR | 2003-50332 | 6/2003 |
| KR | 2004-20149 | * 3/2004 |
| KR | 2005-50222 | 5/2005 |

OTHER PUBLICATIONS

Chinese Office Action issued Aug. 1, 2008 in CN2006101360777.

* cited by examiner

*Primary Examiner*—David M Gray
*Assistant Examiner*—Joseph S Wong
(74) *Attorney, Agent, or Firm*—Stanzione & Kim, LLP

(57) ABSTRACT

A high voltage power supply and a high voltage power control method thereof. The high voltage power supply includes a high voltage generation part to generate a high voltage, and a pulse width modulation (PWM) generation part to generate a pulse width modulation signal according to an output control value and to control the high voltage generation part to generate the high voltage using the generated pulse width modulation signal, when a high voltage output setting signal having the output control value is received by the PWM generation part to indicate the high voltage to be generated. Therefore, it is possible to automatically output a high voltage as desired without requiring an offline setting. In addition, although a voltage set and/or an output load are changed, the changed voltage set and/or the output load are automatically compensated so that a constant high voltage output can be output with a variety of different devices having different loads and power requirements.

19 Claims, 3 Drawing Sheets

HIGH VOLTAGE POWER SUPPLY AND A HIGH VOLTAGE POWER CONTROL METHOD THEREOF

CROSS-REFERENCE TO RELATED APPLICATIONS

This application claims the benefit of Korean Patent Application No. 2005-99178 filed on Oct. 20, 2005, in the Korean Intellectual Property Office, the disclosure of which is incorporated herein by reference in its entirety.

BACKGROUND OF THE INVENTION

1. Field of the Invention

The present general inventive concept relates to a high voltage power supply and a high voltage power control method thereof. More particularly, the present general inventive concept relates to a high voltage power supply, which generates a high voltage power independent of an output load according to a high voltage output setting signal, and a high voltage control method thereof.

2. Description of the Related Art

Generally, a high voltage power supply is used to power an electric device requiring a number of kilo volts (KV) of a high voltage direct current source such as a laser printer and/or a facsimile. The high voltage power supply converts a direct current into a high voltage alternating current (AC), and rectifies the high voltage alternating current to convert the high voltage alternating current into a high voltage direct current (DC). Generally, the high voltage power supply comprises a transformer for converting a direct current into an alternating current.

FIG. 1 is a block diagram illustrating an image forming apparatus including a conventional high voltage power supply 100.

Referring to FIG. 1, the image forming apparatus includes an engine controller 10, a development device 50, and the conventional high voltage power supply 100.

The engine controller 10 controls the high voltage power supply 100 to generate a high voltage power for supplying to the development device 50. Particularly, the engine controller 10 supplies a logic level high signal as a "High/Low" signal and a high voltage power supply (HVPS) control signal to the high voltage power supply 100 only if the high voltage power needs to be output. The engine controller 10 outputs a pulse width modulation signal (PWM 1, PWM 2, ..., PWM n) with a certain duty ratio according to a preset value to the high voltage power supply 100.

A plurality of the pulse width modulation signals (PWM 1, PWM 2, ..., PWM n) are used according to the high voltage power that the development device 50 requires, and a plurality of high voltage power supplies of the high voltage power supply 100 are also required according to the plurality of pulse width modulation signals (PWM 1, PWM 2, ..., PWM n). Accordingly, a plurality of high voltage outputs (HV output 1, HV output 2, ..., HV output n) are output from the plurality of high voltage power supplies of the high voltage power supply 100.

The high voltage power supply 100 can generate a high voltage power of hundreds to thousands of volts by switching on/off due to the pulse width modulation signals (PWM 1, PWM 2, ..., PWM n) applied from the engine controller 10. The high voltage power supply 100 outputs the generated high voltage outputs (HV output 1, HV output 2, ..., HV output n) to the development device 50.

To output the plurality of high voltage outputs (HV output 1, HV output 2, ..., HV output n), the engine controller 10 generates the plurality of the pulse width modulation signals (PWM 1, PWM 2, ..., PWM n). As a result of having to generate the plurality of pulse modulation signals (PWM 1, PWM 2, ..., PWM n), the engine controller 10 is greatly burdened.

Additionally, if the image forming apparatus connected to the conventional high voltage power supply 100 or another output load such as the development device 50 is changed, the high voltage output(s) is also changed. Therefore, a re-tuning of a high voltage outputs (HV output 1, HV output 2, ..., HV output n) is required to output constant high voltage output(s). The high voltage output(s) change according to the output load.

The high voltage output(s) of the conventional high voltage power supply 100 should be set by using a variable resistance in an offline setting, and then be mounted to the image forming apparatus so that it is determined whether the high voltage output(s) having the set value is output. Once this process is completed, the conventional high voltage power supply 100 can be manufactured. Therefore, time and complication for manufacturing the conventional high voltage power supply 100 are costly.

SUMMARY OF THE INVENTION

The present general inventive concept provides a high voltage power supply that reduces a burden on an engine controller and controls a constant high voltage without requiring a retuning when an output load is changed, and a high voltage power control method thereof.

Additional aspects of the present general inventive concept will be set forth in part in the description which follows and, in part, will be obvious from the description, or may be learned by practice of the general inventive concept.

The foregoing and/or other aspects of the present general inventive concept are achieved by providing a high voltage power supply including a high voltage generation part to generate a high voltage, and a pulse width modulation (PWM) generation part to generate a pulse width modulation signal according to an output control value and to control the high voltage generation part to generate the high voltage by using the generated pulse width modulation signal when a high voltage output setting signal having the output control value is received by the PWM generation part to indicate the high voltage to be generated.

The high voltage output setting signal may be received in a serial communication.

The high voltage generation part may include a high voltage transformation part to boost an input direct current power to a high voltage alternating current power using the pulse width modulation signal, and a high voltage rectification smooth part to rectify the boosted high voltage alternating current power to output a high voltage direct current power.

The foregoing and/or other aspects of the present general inventive concept are also achieved by providing a high voltage power supply to produce a high voltage output power, including a pulse control unit to receive one or more voltage indicator signals and to produce a voltage control signal having an adjustable predetermined duty ratio according to the received one or more voltage indicating signals, and a high voltage transformation part to receive the voltage control signal as a first input and a feedback portion of the high voltage output power as a second input and to produce the high voltage output power according to the predetermined duty ratio of the voltage control signal and a level of the feedback portion of the high voltage output power.

The foregoing and/or other aspects of the present general inventive concept are also achieved by providing a high voltage power control method of a high voltage power supply, the method including receiving a high voltage output setting signal including an output control value according to a high voltage to be generated to drive an output device, and generating a pulse width modulation signal according to the received output control value and generating the high voltage using the generated pulse width modulation signal.

The generating of the high voltage may include boosting an input direct current power to a high voltage alternating current power using the pulse width modulation signal, and rectifying the boosted high voltage alternating current power to output a high voltage direct current power.

The foregoing and/or other aspects of the present general inventive concept are also achieved by providing an image forming apparatus including an engine controller to output a high voltage output setting signal including an output control value according to a high voltage to be generated, and a high voltage power supply to receive the high voltage output setting signal in a serial communication, to generate a pulse width modulation signal according to the output control value, and to generate the high voltage using the generated pulse width modulation signal.

The foregoing and/or other aspects of the present general inventive concept are also achieved by providing an image forming apparatus, including a high voltage power supply to produce a high voltage power output including a pulse control unit to receive one or more voltage indicator signals and to produce a voltage control signal having an adjustable predetermined duty ratio according to the received one or more voltage indicator signals, and a high voltage transformation part to receive the voltage control signal as a first input and a feedback portion of the high voltage power output as a second input and to produce the high voltage power output according to the predetermined duty ratio of the voltage control signal and a level of the feedback portion of the high voltage power output.

BRIEF DESCRIPTION OF THE DRAWINGS

The above aspects of the present general inventive concept will be more apparent by describing certain embodiments of the present general inventive concept with reference to the accompanying drawings, in which.

DETAILED DESCRIPTION OF THE PREFERRED EMBODIMENTS

Figure 1:
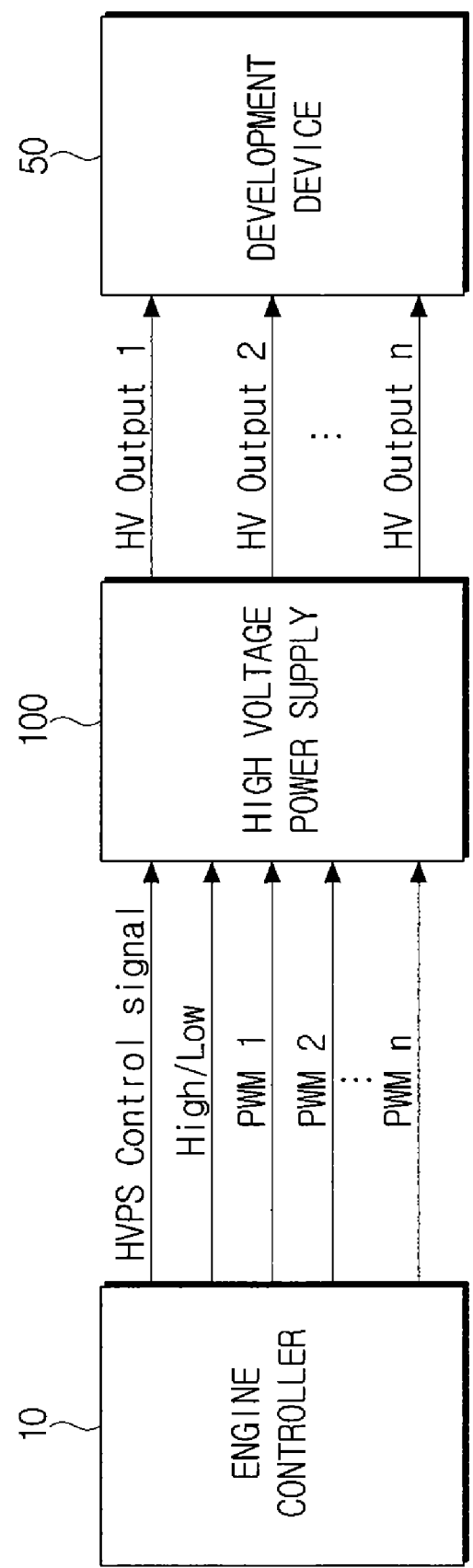
FIG. 1 is a block diagram illustrating an image forming apparatus including a conventional high voltage power supply.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
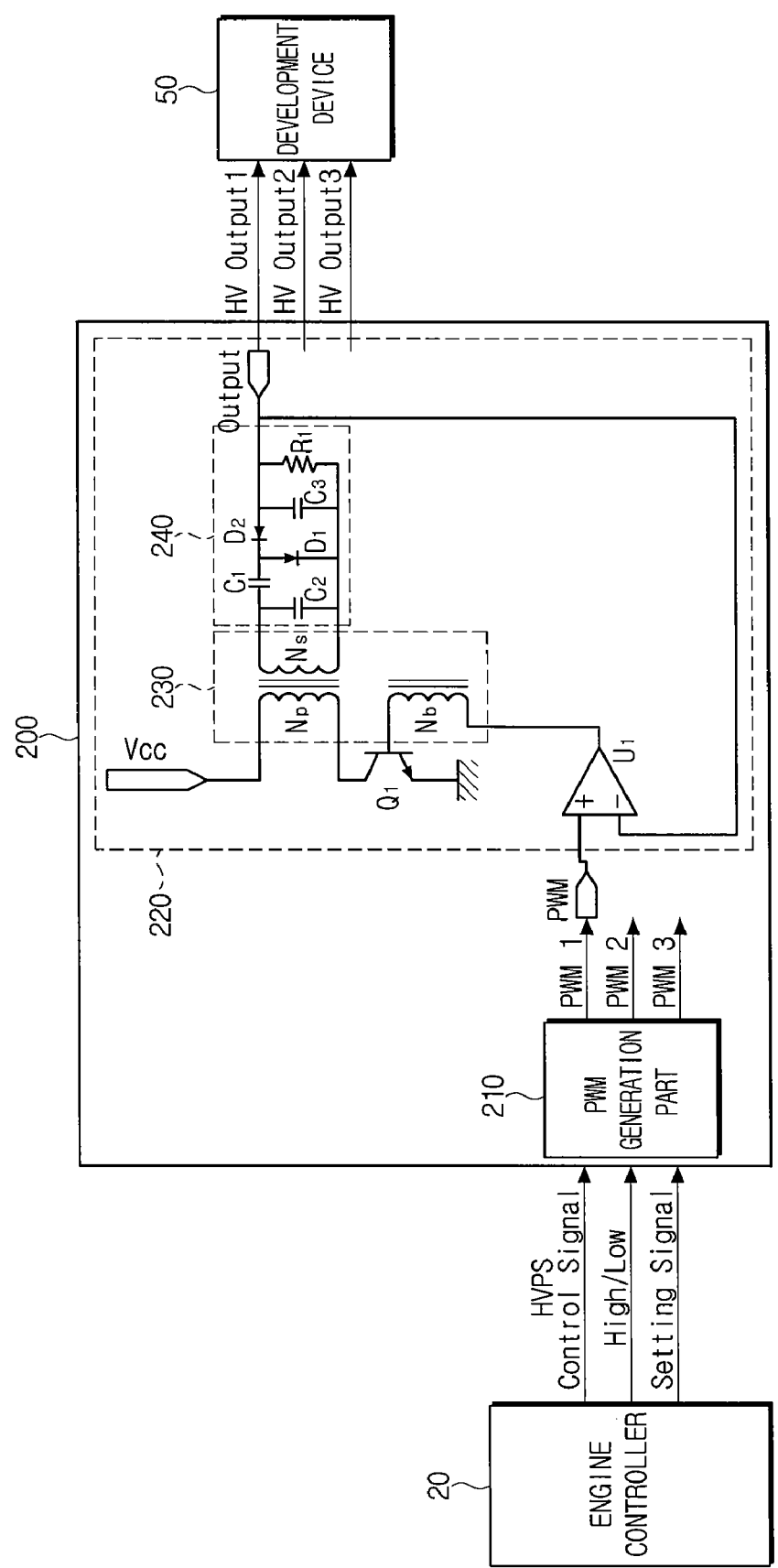
FIG. 2 is a block diagram illustrating an image forming apparatus including a high voltage power supply according to an embodiment of the present general inventive concept.

FIG. 2 is a block diagram illustrating an image forming apparatus including a high voltage power supply 200 according to an embodiment of the present general inventive concept.

The high voltage power supply 200 includes a pulse width modulation (PWM) generation part 210 used to generate a high voltage power independent of an output load applied thereto. The high voltage power supply 200 receives a high voltage output setting signal ("Setting Signal" illustrated in FIG. 2) in a serial communication from an engine controller 20. The high voltage output setting signal is received to indicate the high voltage power output to be used by a development device 50 (or other output load). The high voltage power supply 200 switches on/off by the pulse width modulation signal generated according to the received high voltage output setting signal so as to generate the high voltage power.

Referring to FIG. 2, the image forming apparatus includes the engine controller 20, the development device 50, and the high voltage power supply 200.

The engine controller 20 controls the high voltage power supply 200 to supply the development device 50 with the high voltage power as a "High/Low" signal. Particularly, the engine controller 20 supplies a logic level high signal and a high voltage power supply (HVPS) control signal to the high voltage power supply 200 when the high voltage power needs to be output to the development device 50. For example, when the high voltage power is not to be output to the development device 50, the engine controller 20 may output a logic level low as the "High/Low" signal and/or may not output the HVPS control signal.

The engine controller 20 applies to the high voltage power supply 200 in the serial communication the high voltage output setting signal ("Setting Signal") according to the high voltage power to be supplied to the development device 50. The high voltage output setting signal includes an output control value according to the high voltage power to be supplied to the development device 50. The serial communication may include RS232C, RS422, and I2C communication protocols.

The high voltage power supply 200 generates the high voltage power supplied to the development device 50 and includes the PWM generation part 210 and a high voltage generation part 220.

The PWM generation part 210 generates pulse width modulation signals PWM 1, PWM 2, and PWM 3 according to the high voltage output setting signal(s) applied by the engine controller 20 in the serial communication. The PWM generation part 210 controls the high voltage generation part 220 to generate the high voltage power according to one of the pulse width modulation signals PWM 1, PWM 2, and PWM 3.

The high voltage generation part 220 includes an analog circuit to generate the high voltage power according to one of the pulse width modulation signals PWM 1, PWM 2, and PWM 3. In particular, the high voltage generation part 220 also includes an input direct current power (Vcc) terminal, a high voltage transformation part 230, a high voltage rectification smooth part 240, a comparator U1, a transistor Q1, and an output terminal ("Output" in FIG. 2).

The high voltage transformation part 230 boosts a direct current power of Vcc (e.g., 24V), applied from the input direct current power (Vcc) terminal, to an alternating current power of hundreds to thousands of volts. The high voltage transformation part 230 has coils Np and Nb of an input side of a transformer and a coil Ns of an output side of the transformer. An input side of the coil Np is connected to the input direct current power (Vcc) terminal that applies the direct current power and an output side of the coil Np is connected to a collector of the transistor Q1. A first end of the coil Nb is connected to a base of the transistor Q1 and a second end thereof is connected to an output terminal of the comparator U1. Particularly, the high voltage transformation part 230 transforms the direct current power supplied to the transformer according to the switching of the transistor Q1 into a high voltage so as to induce the high voltage to the output side of the transformer at the coil Ns.

The high voltage rectification smooth part 240 rectifies and smoothes the high voltage alternating current power output from the high voltage transformation part 230 into a high voltage direct current power. The high voltage rectification smooth part 240 outputs the high voltage power output(s) HV output 1, HV output 2, and HV output 3, which become constant by rectifying and smoothing through the output terminal. The high voltage rectification smooth part 240 includes a back pressure rectification circuit having capacitors C1, C2, and C3, diodes D1 and D2, and resistance R1. The capacitor C2, the diode D1, the capacitor C3, and the resistance R1 are connected in a forward direction and in parallel with a ground side of the coil Ns.

The comparator U1 includes a calculation amplifier having a positive (+) input terminal and a negative (−) input terminal. The comparator U1 receives the pulse width modulation signal (i.e., one of the pulse width modulation signals PWM 1, PWM 2, and PWM 3) output from the PWM generation part 210 through the positive input terminal (+) and receives a feedback of a part of the high voltage power output from the high voltage rectification smooth part 240 through the negative input terminal (−) to compare the pulse width modulation signal with the part of the high voltage power output fed back thereto. The output terminal of the comparator U1 is connected to the second end of the coil Nb. The comparator U1 compares the pulse width modulation signal with the part of the high voltage power output fed back to generate a comparator output power. The generated comparator output power drives the transistor Q1. The feedback enables the comparator U1 to drive the transistor Q1 to regulate the direct current power flowing through the input side of the transformer according to the control output value received from the engine controller 20 such that a level of the high voltage direct current power is maintained constant.

The transistor Q1 switches on and off according to the comparator output power of the comparator U1. A high frequency switching power is generated in the collector of the transistor Q1 by the switching. The high voltage transformation part 230 boosts the power generated from the coil Np to generate a high voltage switching power of more than thousands of kilo volts.

In the present embodiment, three pulse width modulation signals PWM 1, PWM 2, and PWM 3 are used as an example, however, it should be understood that other numbers and/or arrangements of pulse width modulation signals may also be used. The number of pulse width modulation signals may be changed according to an output load such as the image forming apparatus or the development device 50.

Figure 3:
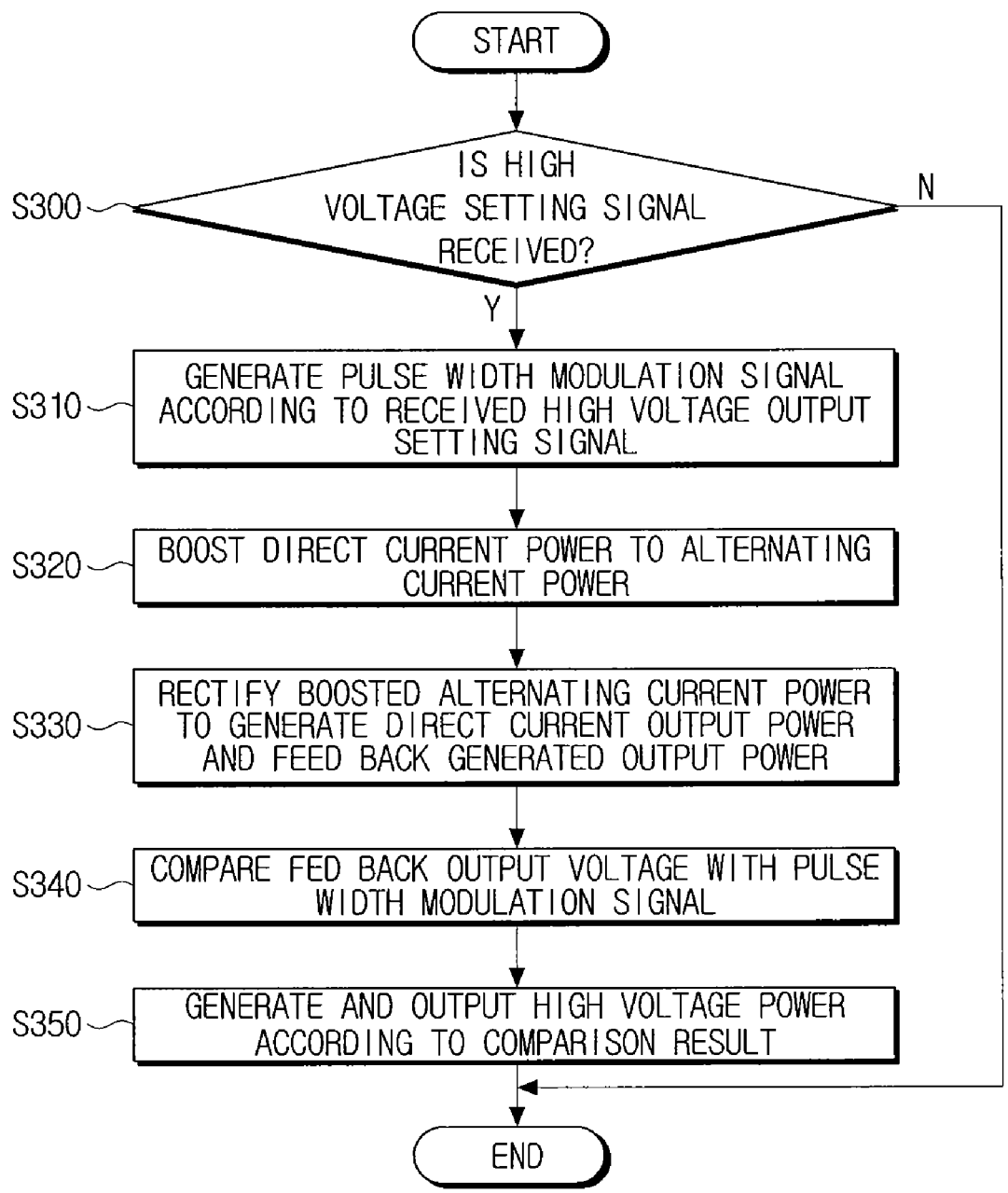
FIG. 3 is a flowchart illustrating a high voltage power control method of a high voltage power supply according to an embodiment of the present general inventive concept.

FIG. 3 is a flowchart illustrating a high voltage power control method of a high voltage power supply according to an embodiment of the present general inventive concept. The control method of FIG. 3 may be applied to the high voltage power supply 200 of FIG. 2. Accordingly, for illustration purposes, the control method of FIG. 3 is described below with reference to FIG. 2.

Referring to FIG. 3, the PWM generation part 210 determines whether the high voltage output setting signal is received from the engine controller 20 (operation S300). The high voltage output setting signal sets the high voltage power output to be generated by the high voltage generation part 220. The engine controller 20 applies the high voltage output setting signal to the PWM generation part 210 when the power is applied to the engine controller 20 or when the development device 50 or output load is replaced.

If it is determined that the high voltage output setting signal is received, the PWM generation part 210 generates the pulse width modulation signal (e.g., PWM 1, PWM 2, and PWM 3) according to the high voltage output setting signal (operation S310).

The high voltage transformation part 230 then boosts the direct current power supplied by the input direct current power (Vcc) terminal to the high voltage alternating current power (operation S320). The high voltage rectification smooth part 240 then rectifies the high voltage alternating current power boosted by the high voltage transformation part 230 to generate the high voltage direct current output power and to feed the generated high voltage direct current output power back to the comparator U1 (operation S330).

The comparator U1 compares the fed back output power with the pulse width modulation signal generated by the PWM generation part 210 (operation S340). The feedback output power enables the comparator U1 to adjust the driving of the transistor Q1 such that the high voltage direct current power can be adjusted and/or maintained at a constant level. Accordingly, even when the output load is changed, the feed back enables constant high voltage output power using the comparator U1.

According to the comparison result of the comparator U1, the high voltage generation part 220 generates and outputs the high voltage power (operation S350). Particularly, the comparator U1 compares the pulse width modulation signal with the fed back output power to generate the comparator output power, and the transistor Q1 switches on and off according to the comparator output power of the comparator U1. The high voltage transformation part 230 transforms the direct current power supplied by the input direct current power (Vcc) terminal according the switching of the transistor Q1 into the high voltage alternating current power to be induced at the output side of the coil Ns. The high voltage rectification smooth part 240 rectifies and smoothes the induced high voltage alternating current power into the high voltage direct current power so as to output the constant high voltage output through the output terminal.

As described above, a high voltage power supply according to various embodiments of the present general inventive concept is controlled to generate a high voltage power so that signals and values received from an engine controller can be smaller in number and dispersive controlling can be performed. Therefore, a burden on the engine controller can be reduced. The high voltage power supply is controlled independently of an output load.

Additionally, according to the various embodiments of the present general inventive concept, a high voltage output can be automatically output as desired without requiring an offline setting, and even when a voltage set and/or an output load are changed, the changed voltage set and/or the output load are automatically compensated to output a constant high voltage output using feedback. Therefore, a high voltage power supply according to the various embodiments of the present general inventive concept can be used with a variety of different devices having different loads and power requirements.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A high voltage power supply comprising:
a high voltage generation part to generate a high voltage, the high voltage generation part including a pulse width modulation (PWM) generation part; and
an engine controller part to output a control value;
wherein the PWM generation part generates a plurality of pulse width modulation signals according to the output control value and controls the high voltage generation part to generate the high voltage by using one of the generated pulse width modulation signals, when a high voltage output setting signal having the output control value is received by the PWM generation part to indicate the high voltage to be generated.

2. The high voltage power supply as claimed in claim 1, wherein the high voltage output setting signal is received in a serial communication.

3. The high voltage power supply as claimed in claim 1, wherein the high voltage generation part comprises:
a high voltage transformation part to boost an input direct current power to a high voltage alternating current power using the pulse width modulation signal; and
a high voltage rectification smooth part to rectify the boosted high voltage alternating current power to output a high voltage direct current power.

4. The high voltage power supply as claimed in claim 1, further comprising:
a comparing unit to form a feedback loop to compare an output of the high voltage generation part and the pulse modulation signal to adjust the high voltage output to be constant when an output load of the high voltage power supply is changed.

5. The high voltage power supply as claimed in claim 4, wherein the high voltage generation part comprises:
a transformer having an input side and an output side;
a direct current input to provide a direct current voltage to the input side of the transformer;
a switch unit connected to the input side of the transformer opposite the direct current input to switch on and off such that when the switch unit is switched on, the direct current voltage is provided to the input side of the transformer and a high voltage alternating current is induced on the output side of the transformer; and
a rectifying unit to rectify the high voltage alternating current into a high voltage direct current as the high voltage output by the high voltage generation part.

6. The high voltage power supply as claimed in claim 5, wherein the switching unit comprises a transistor having a collector terminal connected to the input side of the transformer, a base terminal connected to the comparison unit, and an emitter terminal connected to ground.

7. The high voltage power supply as claimed in claim 5, wherein the comparing unit comprises a comparator having a first input terminal to receive the high voltage direct current from the rectifying unit and a second input terminal to receive the pulse modulation signal from the pulse width modulation part and to output a comparison power signal to control the switch unit to regulate current flow through the transformer.

8. The high voltage power supply as claimed in claim 6, wherein the rectifying unit comprises a back rectification smooth part.

9. A high voltage power supply to produce a high-voltage output power, comprising:

a pulse control unit to receive a plurality of voltage indicator signals and to produce a voltage control signal having an adjustable predetermined duty ratio according to the received plurality of voltage indicator signals; and
a high voltage comparator part to receive the voltage control signal as a first input and a feedback portion of the high voltage output power as a second input and to produce the high voltage output power according to the predetermined duty ratio of the voltage control signal and a level of the feedback portion of the high voltage output power.

10. A high voltage power control method of a high voltage power supply, the method comprising:
receiving a high voltage output setting signal including an output control value according to a high voltage to be generated to drive an output device; and
generating a plurality of pulse width modulation signals according to the received output control value and generating the high voltage using one of the generated pulse width modulation signals.

11. The high voltage power control method as claimed in claim 10, wherein the high voltage output setting signal is received in a serial communication.

12. The high voltage power control method as claimed in claim 10, wherein the generating of the high voltage comprises:
boosting an input direct current power to a high voltage alternating current power using the pulse width modulation signal; and
rectifying the boosted high voltage alternating current power to output a high voltage direct current power.

13. The high voltage control method as claimed in claim 10, further comprising:
comparing an output of the high voltage power supply and the pulse modulation signal to adjust the high voltage output to be constant when an output load of the high voltage power supply is changed.

14. The high voltage control method as claimed in claim 13, wherein the generating of the high voltage using the generated pulse width modulation signal comprises:
receiving a direct current voltage at an input side of a transformer;
switching a flow of the direct current voltage through the input side of the transformer on and off such that when the direct current voltage is switched to flow through the input side of the transformer, a high voltage alternating current is induced on an output side of the transformer; and
a rectifying the high voltage alternating current into a high voltage direct current as the high voltage output.

15. An image forming apparatus comprising:
an engine controller to output a high voltage output setting signal including an output control value to indicate a high voltage to be generated;
a high voltage power supply to receive the high voltage output setting signal in a serial communication, to generate a pulse width modulation signal according to the output control value, and to generate the high voltage using the generated pulse width modulation signal; and
a pulse width modulation (PWM) generation part to generate a plurality of pulse width modulation signals according to the output control value and to control the high voltage generation part to generate the high voltage using one of the generated pulse width modulation signals.

16. The image forming apparatus as claimed in claim 15, further comprising:

a development device to receive the high voltage from the high voltage power supply.

17. The image forming apparatus as claimed in claim 15, wherein the high voltage power supply comprises:
   a high voltage generation part to generate the high voltage; and
   a comparing unit to form a feedback loop to compare an output of the high voltage generation part and the pulse modulation signal to adjust the high voltage output to be constant when an output load of the high voltage power supply is changed.

18. A high voltage power supply comprising:
   a high voltage generation part to generate a high voltage, the high voltage generation part including a high voltage transformation part to boost an input direct current power to a high voltage alternating current power using a pulse width modulation (PWM) signal and a high voltage rectification smooth part to rectify the boosted high voltage alternating current power to output a high voltage direct current power;
   an engine controller part to output a control value; and
   a PWM generation part to generate a PWM signal according to the output control value and to control the high voltage generation part to generate the high voltage by using the generated pulse width modulation signal, when a high voltage output setting signal having the output control value is received by the PWM generation part to indicate the high voltage to be generated.

19. An image forming apparatus, comprising:
   an engine controller to output a high voltage output setting signal including an output control value to indicate a high voltage to be generated;
   a high voltage power supply to receive the high voltage setting signal in a serial communication, to generate a pulse width modulation (PWM) signal according to the output control value, and to generate the high voltage using the generated PWM signal;
   a PWM generation part to generate the PWM signal according to the output control value and to control the high voltage generation part to generate the high voltage using the generated PWM signal;
   a high voltage generation part to generate the high voltage; and
   a comparing unit to form a feedback loop to compare an output of the high voltage generation part and the PWM signal output from the PWM generation part to adjust the high voltage output to be constant when an output load of the high voltage power supply is changed.

* * * * *